United States Patent

Washisu

[11] Patent Number: 5,946,503
[45] Date of Patent: Aug. 31, 1999

[54] IMAGE PROCESSING APPARATUS WHEREIN AN IMAGE STABILIZING DEVICE IS ALSO USED FOR ANOTHER OPERATION

[75] Inventor: Koichi Washisu, Tokyo, Japan

[73] Assignee: Canon Kabushiki Kaisha, Tokyo, Japan

[21] Appl. No.: 08/010,381

[22] Filed: Jan. 28, 1993

[30] Foreign Application Priority Data

Jan. 31, 1992 [JP] Japan .................................. 4-040737

[51] Int. Cl.⁶ .................................................. G03B 17/00
[52] U.S. Cl. ............................................. 396/55; 348/208
[58] Field of Search ............................... 354/70, 76, 105, 354/106, 195.1, 195.12, 202, 430, 432; 359/554–557; 396/52, 53, 55, 213, 310; 348/207, 208

[56] References Cited

U.S. PATENT DOCUMENTS

| | | | |
|---|---|---|---|
| 4,502,771 | 3/1985 | Katsuma et al. | 396/283 |
| 5,128,702 | 7/1992 | Ogawa et al. | 354/106 |
| 5,146,258 | 9/1992 | Bell et al. | 354/432 |
| 5,231,445 | 7/1993 | Onuki et al. | 396/55 |
| 5,266,988 | 11/1993 | Washisu | 354/70 |
| 5,335,032 | 8/1994 | Onuki et al. | 354/195.1 |

*Primary Examiner*—Safet Metjahic
*Assistant Examiner*—J. K. Han
*Attorney, Agent, or Firm*—Fitzpatrick, Cella, Harper & Scinto

[57] ABSTRACT

A system with an image stabilizing device, such as a camera, having (A) an image stabilizing device including an optical blur compensator for blur compensation by a movement in the optical path, a displacement detector for detecting the displacement of the compensator in plural directions, and a gravity direction detector for detecting the direction of gravity based on the output of the displacement detector, and (B) a system element controlled according to the output of the gravity director detector. Thus the optical blur compensator is used also for detecting the direction of gravity, which is utilized for controlling other functions of the system, such as the direction of data recording or the mode of light metering, depending on the position of the system, identified from the direction of gravity. The system can therefore dispense with a separate device for detecting the direction of gravity, thereby achieving reductions in size, cost and weight.

21 Claims, 17 Drawing Sheets

IMAGE PROCESSING APPARATUS WHEREIN AN IMAGE STABILIZING DEVICE IS ALSO USED FOR ANOTHER OPERATION

BACKGROUND OF THE INVENTION

1. Field of the Invention

The present invention relates to an image stabilizing device for compensating an image blur generated by a vibration applied to said device, and more particularly to a system equipped with an image stabilizing device for optical equipment such as a camera utilizing silver chloride film.

2. Related Background Art

In modern cameras, important operations for phototaking, such as determination of exposure and focusing, are all automated so that the possibility of error in phototaking is very low even for the beginner in camera manipulation, but it has been considered very difficult to automatically prevent the error resulting from camera blur.

In recent years, however, there have been made active research and development for a camera capable of preventing such error in phototaking resulting from the camera blur, particularly that resulting from the vibration of hand of the photographer.

Said hand blur at the phototaking is generally a vibration with a frequency of 1 to 12 Hz, and a basic concept for providing a photograph without image blur even in the presence of such hand blur when the shutter is released consists of detecting the camera blur induced by such hand blur, and displacing a compensating lens according to thus detected value. Therefore, for achieving the above-mentioned object of providing a blur-free photograph even in the presence of a camera blur, it becomes necessary to exactly detect the camera vibration, and to compensate the variation in optical axis induced by the hand blur.

Said vibration (camera blur) can be detected, in principle, by loading the camera with a vibration sensor for detecting the angular acceleration, angular velocity, or angular displacement, and camera blur detection means for electrically or mechanically integrating the output signal of said sensor for generating the angular displacement. The image blur compensation is achieved by driving a compensating optical mechanism for deviating the phototaking optical axis, according to the detected information.

In the following there will be briefly explained an image blur suppressing system (antivibration system) employing an angular displacement detecting device as the vibration sensor, with reference to FIG. 8.

FIG. 8 shows a system for suppressing the image blur resulting from a vertical camera vibration $61p$ and a horizontal camera vibration $61y$, indicated by arrows 61.

In FIG. 8 there are provided a lens barrel 62; angular displacement detecting devices $63p$, $63y$ for respectively detecting the vertical and horizontal angular displacements of the camera in respective directions $64p$, $64y$; and calculation circuits $65p$, $65y$ for converting the signals from said detecting devices $63p$, $63y$ into drive target signals for a compensating optical mechanism 66 (including drive units $67p$, $67y$ and compensating optical position sensors $68p$, $68y$), which is driven by said signals to stabilize the image on an image plane 69.

FIG. 9 illustrates an example of said compensating optical mechanism and drive means therefor.

Referring to FIG. 9, a fixing frame 547, supporting a compensating lens 545, is rendered slidable on a pitch slide shaft $549p$, across a slide bearing $548p$ for example of polyacetal (POM) resin. Said frame 547 is pinched between pitch coil springs $551p$ coaxial with the pitch slide shaft $549p$, and is maintained around the neutral position. Said pitch slide shaft $549p$ is mounted on a first support frame 550.

A pitch coil $552p$, mounted on said frame 547, is placed in a magnetic circuit composed of pitch magnets $553p$ and a pitch yoke $554p$, whereby the frame 547 is moved in a pitch direction $546p$ in response to a current. Said pitch coil $552p$ is provided with a pitch slit $555p$, for detecting the position of the frame 547 in the pitch direction $546p$, in cooperation with a light-emitting element $556p$ (infrared light-emitting diode) and a photosensor $557p$ (semiconductor position detector PSD).

On a first support frame 550 there is fitted a slide bearing $548y$ for example of POM resin, whereby it can slide on a housing 558 on which the yaw slide shaft $549y$. Since said housing 558 is mounted on an unrepresented lens barrel, the first support frame 550 is rendered movable in the yaw direction $546y$, with respect to said lens barrel. Coaxially with the yaw slide shaft $549y$, there are provided yaw coil springs $551y$, whereby the housing is maintained about the neutral position, as in case of the frame 547.

Said frame 547 is also provided with a yaw coil $552y$, and can also be driven in the yaw direction $546y$, in cooperation with yaw magnets $553y$ positioned on both sides of the yaw coil $552y$ and a yaw yoke $554y$. Said yaw coil $552y$ is provided with a yaw slit $555y$, for detecting the position of the frame 547 in the yaw direction $546y$, in a similar manner as in the pitch direction.

Referring to FIG. 9, the outputs of the photosensors $557p$, $557y$ are amplified by amplifiers $559p$, $559y$ and supplied, through various illustrated circuits to be explained later, to the pitch coil $552p$ and the yaw coil $552y$, whereby the frame 547 is driven to vary the outputs of the photosensors $557p$, $557y$. If the polarities of the coils $552p$, $552y$ are so selected as to reduce the outputs of said photosensors $557p$, $557y$, there are formed closed loop systems, which are stabilized at points where the outputs of the photosensors $557p$, $557y$ become substantially zero.

There are also provided compensating circuits $560p$, $560y$ for further stabilizing the system shown in FIG. 9; adding circuits $563p$, $563y$ for adding entered instruction signals to the outputs of the amplifiers $559p$, $559y$, and driver circuits $561p$, $561y$ for generating currents to be supplied to the coils $552p$, $552y$.

When instruction signals $562p$, $562y$ are given to the above-explained system, the compensating lens 545 is driven in the pitch direction $546p$ and in the yaw direction $546y$, extremely faithfully to said instruction signals.

The above-explained driving method is already known for position control, and said amplifiers $559p$, $559y$, compensators $560p$, $560y$ and drivers $561p$, $561y$ constitute drive means for the compensating optical mechanism.

FIG. 10 shows the aforementioned drive means for driving the compensating optical mechanism in more details, said means being shown only for the pitch direction $546p$.

Current-voltage converting amplifiers $564a$, $564b$ convert photocurrents generated in the photosensor $557p$ (consisting of resistors R1, R2) by the light from the light-emitting element $556p$, and a differential amplifier 565 determines the difference in the outputs of said current-voltage converting amplifiers $564a$, $564b$. The obtained difference signal represents the position of the compensating lens 545 in the pitch direction $546p$. The current-voltage converting amplifiers 564a, 564b, differential amplifier 565 and resistors R3–R10 constitute the amplifier 559p shown in FIG. 9.

An amplifier 566 adds an instruction signal 562p to the difference signal from said differential amplifier 565, and constitutes the adding circuit 563p shown in FIG. 9, in combination with resistors R11–R14. Resistors R15, R16 and a capacitor C1 constitute a known phase advancing circuit, which corresponds to the compensator 560p in FIG. 9, for stabilizing the system.

The output of said adding circuit 563p is supplied, through the compensating circuit 560p, to the driving amplifier 567, which generates a driving signal for the coil 552p, thereby displacing the compensating lens 545. Said driving amplifier 567, resistor R17 and transistors TR1, TR2 constitute the driver circuit 561p in FIG. 9.

An adding amplifier 568 determines the sum of the outputs of the current-voltage converting amplifiers 564a, 564b (namely the total received light amount of the photosensor 557p), and a driving amplifier 569, receiving said sum signal, accordingly drives the light-emitting element 556p. The adding amplifier 568, driving amplifier 569, resistors R18–R22 and a capacitor C2 constitute a driving circuit (not shown in FIG. 9) for the light-emitting element 556p.

The emitted light amount of said light-emitting element 556p varies quite unstably depending for example on the temperature, and the positional sensitivity of the differential amplifier 565 varies accordingly. However such variation can be prevented by controlling the light-emitting element 556p by the above-mentioned driving circuit in the above-mentioned manner that the total received light amount becomes constant.

In the following there will be explained an example of the angular displacement detecting device, employed as said vibration sensor, with reference to FIGS. 11 to 14.

Referring to FIGS. 11 to 14, there are provided a base plate 51 for mounting various components constituting the device; an outer tube 52 provided therein with a chamber enclosing a floating member 53 to be explained later and liquid 54; and a floating member 53 supported by a float supporting member 55, to be explained later, in rotatable manner about a shaft 53a. A projection 53b is provided with a slit-shaped reflective face, and is composed of a permanent magnet, magnetized in the direction of said shaft 53a. Said float member 53 is so constructed as to be balanced in rotation and in floating force about the shaft 53a.

A float supporting member 55 is fixed to the outer tube 52 and supports the floating member 53 through a pivot bearing 56 to be explained later. A square U-shaped yoke 57 mounted on the base plate 51 forms a closed magnetic circuit, in cooperation with the floating member 53. A coil 514 is provided between the floating member 53 and the yoke 57, in fixed relation to the outer tube 52. A light-emitting element (iRED) 58 generates light in response to the current supply and is mounted on the base plate 51. A photosensor PSD, varying the output depending on the position of received light, is mounted on the base plate 51. These light-emitting element 58 and the photosensor 59 constitute optical angular displacement detecting means in which the light is transmitted through a projection (reflecting face) 53b of said floating member 53.

A mask 510 provided in front of the light-emitting element 58 is provided with a slit 510a for passing the light. A stopper member 511, mounted on the outer tube 52, limits the range of rotation of the floating member 53.

The above-mentioned floating member 53 is rotatably supported in the following manner. At the center of the floating member 53, pivots 512 with pointed ends are provided at the upper and lower positions, as shown in FIG. 12 which is a cross-sectional view along a line A—A in FIG. 11. On the other hand, pivot bearings 56 are provided, in mutually opposed manner, at the ends of upper and lower arms of the square U-shaped of said float supporting member 55, and the pointed ends of said pivots 512 are fitted in said pivot bearings, whereby said floating member is supported.

An upper cover 513 of the outer tube 52 is adhered, for example, with known silicon adhesive, thereby sealing the liquid 54 inside the outer tube 52.

In the above-explained configuration, the floating member 53 is formed symmetrically about the rotary axis 53a and is composed of a material of the same specific gravity as that of the liquid 54, so that the floating member 53 does not generate any rotational moment under the influence of gravity in any position, and does not apply any substantial load to the pivot axis. In practice it is not possible to attain zero unbalance, but the error in shape is sufficiently small because the actual unbalance only results from the difference in specific gravity, so that the S/N ratio of friction to the inertia is extremely high.

In such structure, even when the outer tube 52 rotates about the shaft 53a, the internal liquid 54 remains standstill to the absolute space by inertia, so that the floating member 53 does not rotate and there is generated a relative rotation about the rotary axis 53a between the outer tube 52 and the floating member 53. Such relative angular displacement can be detected by the above-mentioned optical detecting means utilizing the light-emitting element 58 and the photosensor 59.

In the above-explained device, the angular displacement is detected in the following manner.

The light from the light-emitting element 58 passes the slit 510a of the mask 510, then irradiates the floating member 53, is reflected by the slit-shaped reflecting face of the projection 53b and reaches the photosensor 59. In this light transmission, said light is formed as a substantially parallel beam by the slit 510a and the slit-shaped reflecting face, whereby a blur-free image is formed on the photosensor 59.

Since the outer tube 52, the light-emitting element 58 and the photosensor 59 are mounted on the base plate 51 and move integrally, the slit image on the photosensor 59 moves by an amount corresponding to the relative angular displacement between the outer tube 52 and the floating member 53. Consequently the output of the photosensor 59, which varies the output according to the position of the received light, corresponds to the positional displacement of said slit image, and the angular displacement of the outer tube 52 can be detected from said output.

As explained before, the floating member 53 is composed of a permanent magnet of the same specific gravity as that of the liquid 54, and such configuration can be attained in the following manner.

When the liquid 54 is composed of inert fluorinated liquid, fine powder of a permanent magnet material, such as ferrite, is mixed as filler into a plastic material, and a specific gravity comparable to that of 1.8 of said liquid can be easily attained around a volume content of 8%. After or simultaneous with the molding of the floating member 53 with such material, it can be magnetized in the direction of said axis 53a, whereby the floating member 53 has the property as a permanent magnet.

FIG. 14 is a cross-sectional view, along a line B—B in FIG. 11, showing the relationship among the floating member 53, the yoke 57 and the coil 514.

As shown in FIG. 14, the floating member 53 is magnetized along its axis 53a, with N and S poles at above and below. The magnetic flux from the N pole passes the square U-shaped yoke 57 and enters the S pole, thus forming a closed magnetic circuit. Thus, if the coil 514 positioned in said circuit is given an electric current from the rear side to the front side of the plane of drawing, said coil 514 receives a force in a direction f, according to Flemming's left hand rule. However, said coil 514 cannot move as it is fixed to the outer tube 52 as explained before, so that a reaction drives the floating member 53 in a direction F. Said reaction is proportional to the current supplied to the coil 514, and is naturally reversed in direction if the direction of the current is reversed. Therefore, the floating member 53 can be arbitrarily driven in this configuration.

The elastic force exerted on the floating member 53 by said driving force is, in principle, to maintain the floating member 53 at a constant position relative to the outer tube 52 (namely moving the two in integral manner). Therefore, if said elastic force is strong, the outer tube 52 and the floating member 53 move integrally, so that the desired angular displacement is not generated. However, if said driving (elastic) force is sufficiently smaller than the inertia of the floating member 53, there can be obtained a response even to an angular displacement of a relatively low frequency.

FIG. 15 shows an electrical circuit of the angular displacement detecting device explained above.

Current-voltage converting amplifiers 515a, 515b (and resistors R33–R36) convert the photocurrents 517a, 517b generated in the photosensor 59 by the reflected light 516 from the light-emitting element 58 into voltages, and a differential amplifier 518 (and resistors R37–R40) the difference in the outputs of said current-voltage converting amplifiers 515a, 515b, namely the angular displacement (relative angular movement between the outer tube 52 and the floating member 53). The output thus obtained is divided by resistors 519a, 519b to obtain an extremely small output, which is supplied to a driving amplifier 520 (and a resistor R41 and transistors TR11, TR12) for supplying a current to the coil 514. By effecting a negative feedback (the wiring to the coil 514 and the direction of magnetization of the floating member 53 being so selected that the floating member 53 returns to the center position in response to the output of a differential amplifier 518), there is generated an elastic force (driving force) sufficiently smaller than the inertia of the floating member 53 as explained above.

An adding amplifier (and resistors R42–R45) obtains the sum of the outputs of said amplifiers 515a, 515b (corresponding to the total amount of the reflected light 516 received by the photosensor), and the obtained sum is supplied to a driving amplifier 522 (and resistors R47–R48, a transistor TR13 and a capacitor C11) for activating the light-emitting element 58.

Although the light emission of the light-emitting element 58 varies quite unstably depending on the temperature, the above-explained driving method of said element according to the total amount of received light provides an always constant total photocurrent from the photosensor 59, so that the detection sensitivity of the differential amplifier for the angular displacement becomes extremely stable.

FIG. 16 shows the structure of a servo angular acceleration sensor, representing another example of the vibration sensor.

An outer frame bottom member 523 is integrally fixed to a support member 524 and bearings 525a, 525b of low friction, such as ball bearings, which support the both ends of a shaft 526. Said shaft 526 rotatably supports a seesaw 528 equipped with coils 527a, 527b.

Above and below said coils 527a, 527b and seesaw 528, and spaced therefrom, there provided magnetic circuit plates 530a, 530b constituting cover members and permanent magnets 531a, 531b, 532a, 532b in mutually opposed manner. As mentioned above, the magnetic circuit plates 530a, 530b also serve as cover members for the outer frame. Said permanent magnets 531a, 531b, 532a, 532b are mounted on magnetic circuit rear plates 533a, 533b which are fixed at the bottom of the outer frame 523.

On the coil 527a of said seesaw 528, there is provided a slit plate 534 provided with a slit 534a penetrating in the direction of thickness. The magnetic circuit plate 530a, positioned above said slit 534a and serving as the cover member of the outer frame, is equipped with a photoelectric displacement measuring device 535 such as a SPC (separate photodiode), while the magnetic circuit rear plate 533a, positioned below the slit 534a, is equipped with a light-emitting element 536 such as an infrared light-emitting diode.

In the above-explained structure, when an angular acceleration a is applied to the outer frame as indicated by an arrow 537, the seesaw 528 is inclined in relative manner in a direction opposite to said angular acceleration a, and the angle of said inclination can be detected by the position, on the displacement measuring device 535, of a light beam emitted from the light-emitting element 536 and transmitted by the slit 534a.

The magnetic fluxes from said permanent magnets 531a, 531b pass the coils 527a, 527b, magnetic circuit plates 530a, 530b, and coils 527a, 527b again to reach the permanent magnets 532a, 532b, while those from said magnets 532a, 532b pass the magnetic circuit rear plates 533a, 533b and return to said magnets, whereby closed magnetic circuits are formed, with magnetic fluxes running perpendicularly to the coils 527a, 527b. Therefore, by a control current given to the coils 527a, 527b, the seesaw 528 can be driven along or opposite to the direction of said angular acceleration a.

FIG. 17 shows an example of the angular acceleration detecting circuit, to be employed in the servo angular acceleration sensor of the above-explained configuration.

Said circuit consists of a serial connection of a displacement detecting amplifier 538 for amplifying the output from the above-mentioned detector 535, a compensating circuit 539 for stabilizing the feedback system, a driver circuit 540 for current amplification of the amplified output from said detecting amplifier 538, for supply to the coils 527a, 527b, and said coils 527a, 527b.

In this example, the winding direction of said coils 527a, 527b and the direction of polarity of the permanent magnets 531a, 531b, 532a, 532b are so selected that a force is generated in a direction opposite to the rotating direction of the seesaw 528 under the external angular acceleration a when said coils 527a, 527b are energized.

The servo angular acceleration sensor of the above-explained configuration functions in the following manner. When an angular acceleration a is applied to said sensor as shown in FIG. 16, the seesaw 528 rotates, by inertia, in the opposite direction relative to the outer frame, whereby the slit 534a, provided on said seesaw 528, moves in a direction L. Consequently the center of the light beam entering the detector 535 from the light-emitting element 536 is displaced, and the detector 535 generates an output proportional to the amount of said displacement.

Said output is amplified in the displacement detecting amplifier 538, then subjected to current amplification in the driver circuit 540 after passing the compensating circuit, and supplied to the coils 527a, 527b.

When the coils 527a, 527b are given a control current as explained above, the seesaw 528 is given a force in a direction R, which is opposite to the direction L of the external angular acceleration a, and said control current is regulated in such a manner that the light beam entering the displacement detector 535 returns to the initial position in the absence of said external angular acceleration a.

The control current in said coils 527a, 527b is proportional to the rotating force applied to the seesaw 528, and said rotating force is proportional to the force required to return said seesaw to its original position, or to the magnitude of the external angular acceleration a. Consequently the angular acceleration a, required as control information for example in the image blur suppressing system of a camera, can be obtained by said control current, read as a voltage V across a resistor 541.

FIG. 18 is a more detailed circuit diagram of the angular acceleration detecting circuit shown in FIG. 17.

In the circuit shown in FIG. 18, an amplifier 538a and resistors 538b, 538c correspond to the displacement detecting amplifier 538 in FIG. 17, and effect detection of position, by amplification, with conversion to voltage, of the photocurrent from the displacement detector 535. A capacitor 539a and resistors 539b, 539c correspond to the compensating circuit 539, while a driving amplifier 540a, transistors 540b, 540c and resistors 540d, 540e, 540f correspond to the driver circuit 540 for driving the coils 527a, 527b.

A camera is usually provided with a function of light metering and a function of date recording, and it is already known that, if these functions are executed in consideration of the camera position (whether the photographer holds the camera in horizontal or vertical position), there can be obtained a more accurate result (in case of-light metering) or a more comfortably observable photograph (in case of date recording). More specifically, for example, the date recording matching the direction of the photographed object can be achieved by recording the date in the lower part of the image frame along the longer side thereof when the camera is held in the horizontal position, and in the lower part along the shorter side when the camera is held in the vertical position.

For realizing such function, the camera has to be equipped with means for detecting the position of the camera (namely means for detecting the direction of gravity), but the camera will inevitably become bulky and expensive if it is equipped with the above-explained antivibration system, in addition to such position detecting means.

SUMMARY OF THE INVENTION

An aspect of the present invention is to provide a system with an image stabilizing device, comprising an image stabilizing device including blur compensation optical means for effecting blur compensation by a movement in the optical path, displacement detection means for detecting the displacement of said blur compensation optical means in plural directions, and gravity direction detecting means for detecting the direction of gravity based on the output of said displacement detection means; and an element to be controlled according to the output of said gravity direction detecting means, wherein the detection output of direction of gravity, detected by said image stabilizing device is used in the control of said element which requires the gravity information for the control. When this configuration is applied to a camera, there are effected controls such as the determination of direction of data recording and the variation in weighting of light-metered values according to the output of said gravity direction detecting means.

Another aspect of the present invention is to provide a system with an image stabilizing device, comprising abnormality detection means for detecting an abnormality in the function of a camera, and control means for giving an alarm for the abnormal function of the camera by forcedly driving the blur compensating optical means in response to the detection of abnormality by said abnormality detection means, wherein said blur compensating optical means works also as a part of means for providing the alarm.

Still another aspect of the present invention is to provide a system with an image stabilizing device, comprising, in addition to the blur compensating optical means, vibration detection means for detecting vibration generated by the function of a motor, and vibration suppressing control means for suppressing said vibration by driving said blur compensating optical means, according to the output of said vibration detection means, wherein said blur compensating optical means works also as a part of means for vibration suppressing operation.

Still another aspect of the present invention is to provide a system with an image stabilizing device, comprising vibration detection means for detecting vibration generated by the function of a motor, and vibration suppressing control means for driving the blur compensation optical means so as to cancel said vibration, wherein a vibration suppressing effect is obtained by the drive of the blur compensation optical means.

Still another aspect of the present invention is to provide a system with an image stabilizing device, comprising linkage means for linking the drive of the blur compensation optical means, outside a driving range for blur compensation, with an open/closing mechanism for a barrier member or an up/down mechanism for an electronic flash, and control means for driving the blur compensation optical means outside the driving range for blur compensation, thereby opening or closing the barrier member or elevating or lowering the electronic flash device, whereby attained are functions other than the image stabilizing function.

DETAILED DESCRIPTION OF THE PREFERRED EMBODIMENTS

Now the present invention will be clarified in detail by preferred embodiments thereof shown in the attached drawings.

Figure 1:
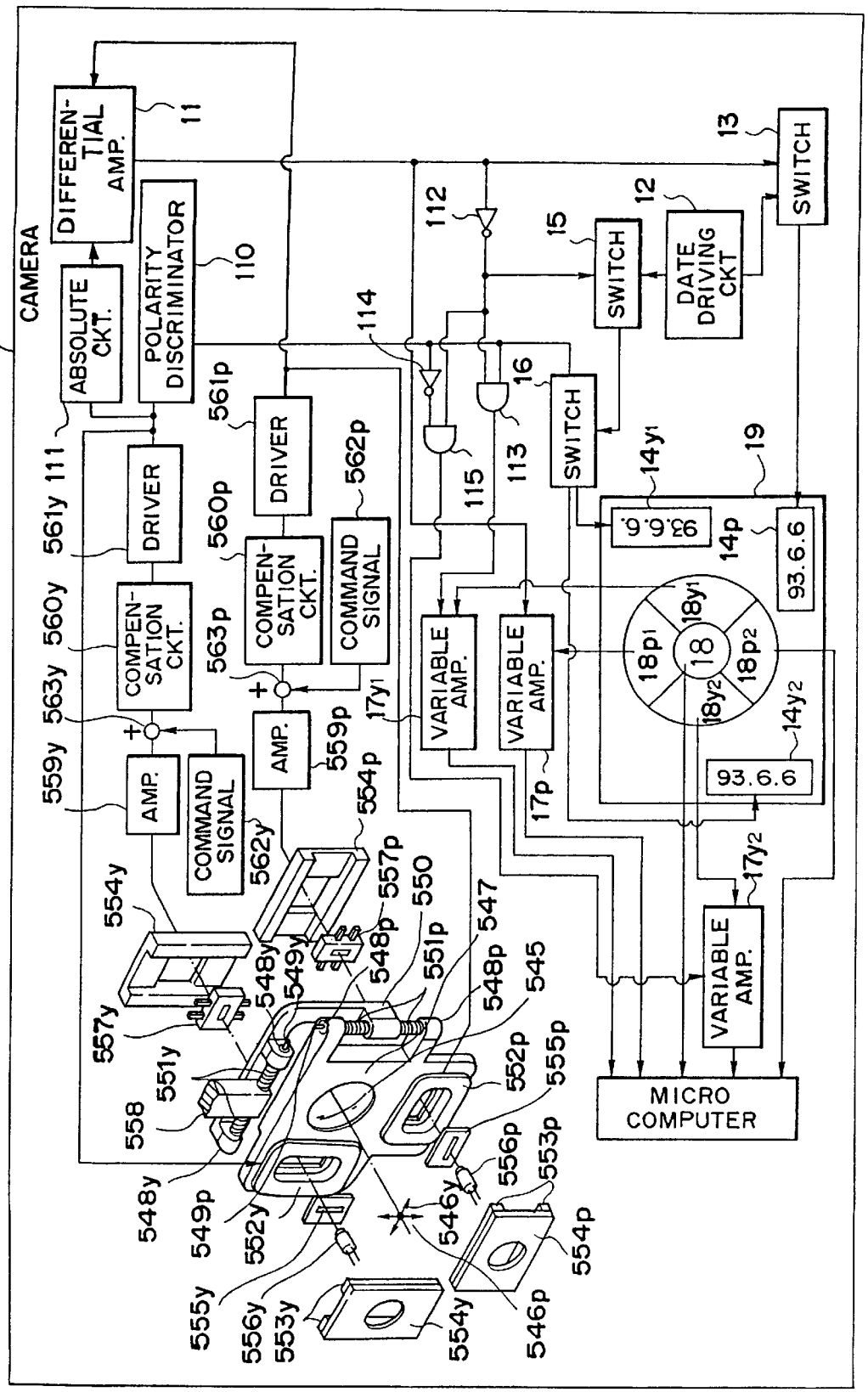
FIG. 1 is a perspective view showing the principal configuration of a camera with antivibration function, constituting a first embodiment of the present invention.

FIG. 1 shows the principal configuration of a camera 1 with antivibration function in a first embodiment of the present invention, wherein a compensating optical mechanism and driving means therefor are utilized for detection of gravity.

As explained before, the compensating optical mechanism, when activated, becomes stabilized at a point where the outputs of the photosensors 557$p$, 557$y$ become zero. For continuing stabilization at said point, the current is continuously supplied to the pitch coil 552$p$ or the yaw coil 552$y$, since otherwise the compensating optical mechanism tends to escape, by its weight, from the point of zero outputs of the photosensors 557$p$, 557$y$. The directions of the currents supplied to said coils 552$p$, 552$y$ vary according to the direction of gravity, and the amounts of said currents are proportional to the magnitude of gravity. (Though the gravity itself is constant, the force applied to the compensating optical mechanism by the gravity varies according to whether the optical axis of said mechanism is perpendicular or parallel to the direction of gravity.) More specifically, when the camera is placed in the horizontal position parallel to the ground (in which the longer side of the finder frame is parallel to the ground), the pitch coil 552$p$ requires a largest current in order to resist the gravity, while the yaw coil 552$y$ does not require such current. When the camera is gradually directed upward to the sky, the current required in the pitch coil 552$p$ decreases gradually, and, when the optical axis becomes perpendicular to the ground, the current required for resisting the gravity is no longer present in the pitch coil 552$p$ or in the yaw coil 552$y$. If the camera is further inclined in the same direction, the current to the pitch coil 552$p$ gradually increases, with an inverted direction.

When the camera is placed in the vertical position (in which the shorter side of the finder frame is parallel to the ground), the yaw coil 552$y$ requires a largest current for resisting the gravity, and the direction of said current varies according to the direction of said vertical position, namely whether the right hand or left hand of the photographer comes closer to the ground.

It is therefore possible, in this manner, to detect the direction of gravity by the driving force in the compensating optical mechanism and to automatically identify the position of the camera.

In the embodiment shown in FIG. 1, such gravity detection is utilized in date recording and in the mode of light metering.

At first, when the photographer holds the camera in the horizontal position, the driver circuit 561$p$ has a largest output while the driver circuit 561$y$ has an extremely small output, as explained before. These outputs are supplied to a differential amplifier 11, which effects differential amplification on said outputs and releases an output when the output of the driver circuit 561$p$ is larger. In this case, therefore, the differential amplifier 11 releases an output to connect a date driving circuit 12 to a date display unit 14$p$ by a switch 13, thereby recording the date in the horizontal position.

Also light-metering areas (schematically shown on the image field 19 in FIG. 1, but in fact present on an unrepresented light-metering sensor) are present in a central area 18 and peripheral areas 18$p_1$, 18$p_2$, 18$y_1$ and 18$y_2$, and the camera employs a light metering method in which the light metering is conducted in each of said areas and the metered light value is determined from the calculation of thus metered light values. For varying the weighting of thus metered light values, the outputs of the light metering areas 18$p_1$, 18$y_1$, 18$y_2$ are supplied respectively to variable-gain amplifiers 17$p$, 17$y_1$, 17$y_2$.

In the above-mentioned position of the camera, the output of the differential amplifier 11 is supplied to the variable-gain amplifier 17$p$ for reducing the gain thereof, thereby decreasing the weight of the light-metering area 18$p_1$. In this camera position, the light metering area 18$p_1$ often corresponds to a bright background, such as sky, of the object field, thus providing a much higher output than in other light-metering areas, and the above-mentioned gain control is to prevent deterioration of accuracy resulting from such high output.

In case the photographer holds the camera in vertical position, there are attained the following functions.

In this case, the driver circuit 561$y$ provides the yaw coil 552$y$ with a large current, of which direction is reversed according to whether the right or left hand is closer to the ground in such vertical camera holding. Said direction is discriminated by a polarity discriminator circuit 110, which releases an output when the right hand is positioned above. Also the output of the driver circuit 561$y$ is converted in an absolute value in an absolute value circuit 111 and supplied to the differential amplifier 11 for determining the difference from the output of the driver circuit 561$p$. In this vertical camera position, the differential amplifier 11 does not provide the output, since the output of the driver circuit 561$y$ is larger than that of the driver circuit 561$p$. Consequently, an output signal is obtained from an inverter 112 connected to the amplifier 11, whereby a switch 15 is closed to supply the output of the date driver circuit 12 to the switch 16.

Consequently, in the vertical camera position with the right hand above, the polarity discriminator circuit 110 releases an output, whereby a switch 16 connects the date driver circuit 12 to a date display unit 14$y_2$ of which displayed date is recorded.

Also in this state, an output is obtained from an AND gate 113 which receives the output of the polarity discriminator circuit 110 and the output of the inverter 112, whereby the gain of the variable-gain amplifier $17y_1$ is reduced and the weight of the light-metering area $18y_1$ is decreased. This is because, in this camera position, the light-metering area $18y_2$ measures the upper part of the image frame, corresponding to the sky of high luminosity.

In the vertical camera position with the right hand below, the polarity discriminator circuit 110 does not release the output, whereby the switch 16 connects the date driver circuit 12 to a date display unit $14y_1$ for recording the date displayed therein.

In this state, an output is obtained from an inverter 114, as the polarity discriminator circuit 110 does not release the output. Also an output is obtained from the inverter 112, so that an output is obtained from an AND gate 115 to reduce the gain of the variable-gain amplifier $17y_2$, thus decreasing the weight of the light-metering area $18y_2$. In this camera position, said light-metering area $18y_2$ corresponds to the sky in the background.

The weight of the light-metering area $18p_2$, because the camera is usually not so positioned that said area corresponds to the sky.

As explained in the foregoing, the compensating optical mechanism and the driving means therefor are utilized for the detection of gravity, and the variation in the direction of date recording and in the weighting of light metering can be achieved without relying on other gravity sensors such as a mercury switch. Such a configuration contributes to the reduction in size, cost and weight of the camera. In addition, the gravity detection by the compensating optical mechanism is extremely precise and fast in response, in comparison with the detection with the mercury switch, thereby enabling stable light metering and date recording.

2nd Embodiment

Figure 2:
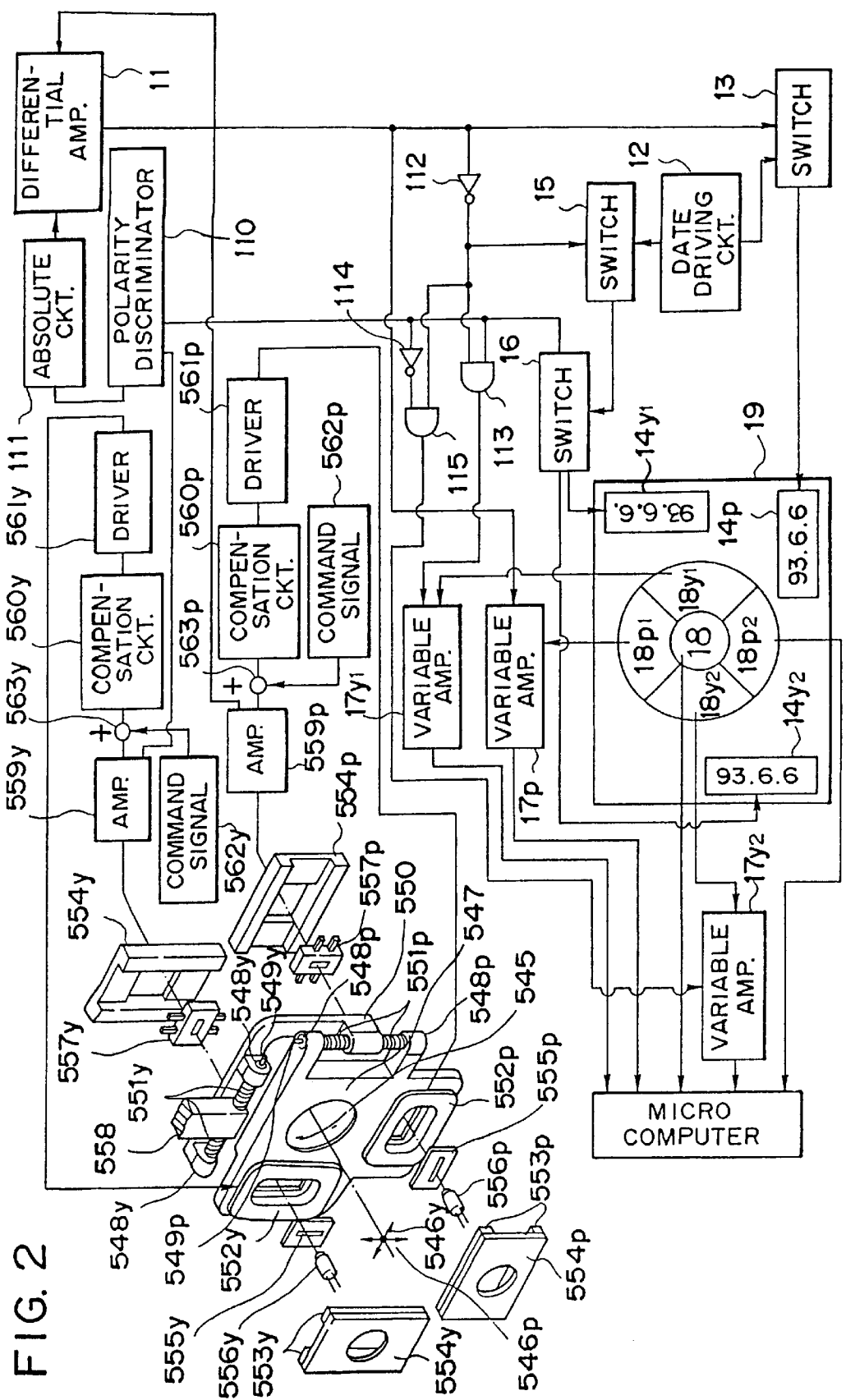
FIG. 2 is a perspective view showing the principal configuration of a camera with antivibration function, constituting a second embodiment of the present invention.

FIG. 2 shows the principal configuration of a camera with antivibration function constituting a second embodiment of the present invention, wherein same components as those in FIG. 1 are represented by same numbers.

Figure 10:
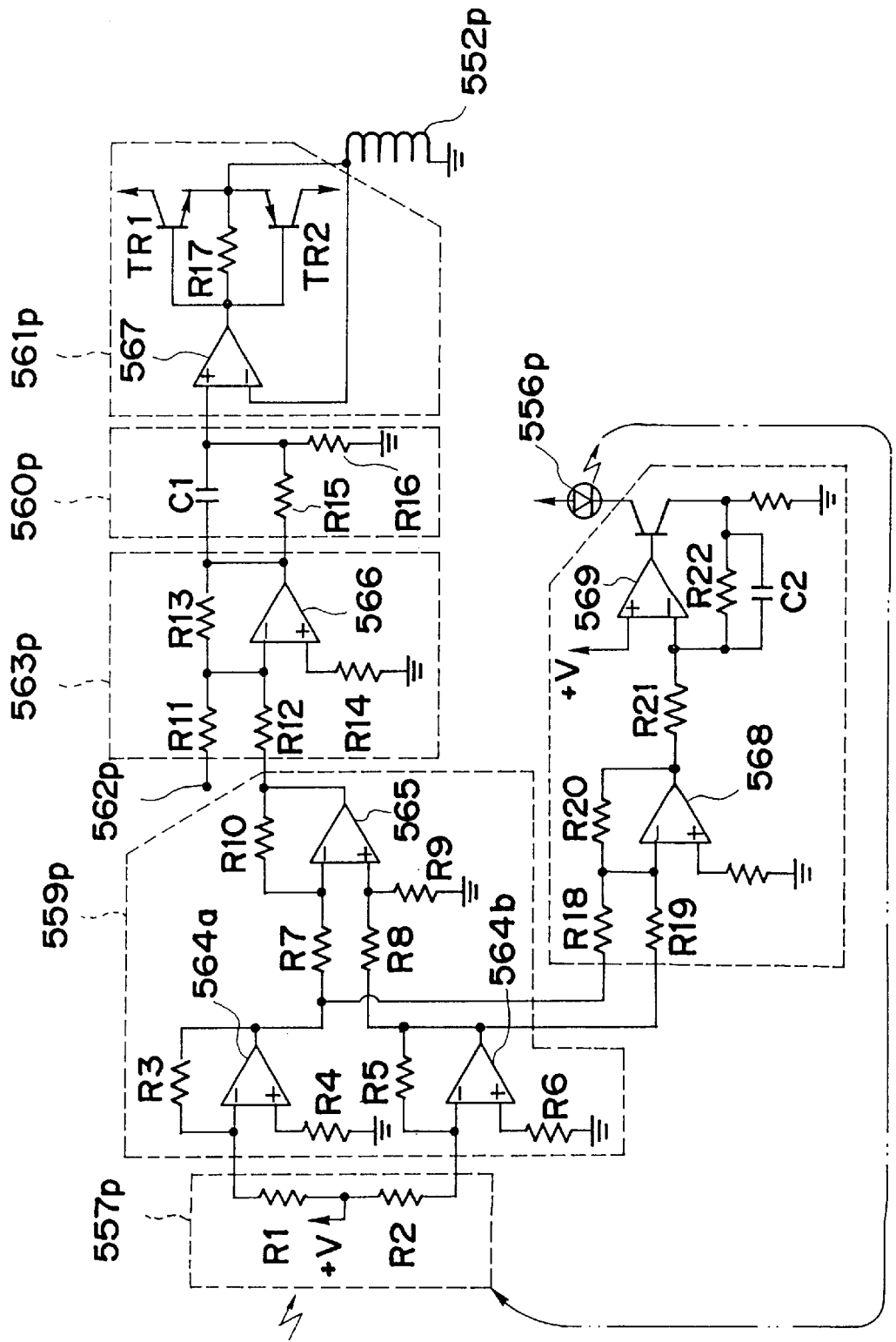
FIG. 10 is a circuit diagram showing the details of the electrical configuration shown in FIG. 9.

The detection of gravity in the foregoing first embodiment is conducted by the outputs of the driver circuits $561p$, $561y$, but it may also be conducted, as shown in FIG. 2, by the outputs of the amplifiers $559p$, $559y$, since, as shown in FIG. 10, the output of the operational amplifier 567 (outputs of the driver circuits $561p$, $561y$) is the output of the operational amplifier 565 obtained through the operational amplifier 566, namely the amplified output of the photosensor $557p$ or $557y$.

Thus the second embodiment effects the detection of gravity by the outputs of the amplifiers $559p$, $559y$ as shown in FIG. 2, and this configuration allows to use a more efficient driving method, such as PWM, in the driver circuits $561p$, $561y$ as they are not used for gravity detection.

As explained in the foregoing, in the first and second embodiments of the present invention there is provided detection means for detecting the direction of gravity by obtaining a signal indicating said direction from driving means in the antivibration system, and the detection means of the camera for the direction of gravity is obtained by using a part (compensating optical mechanism and driving means therefor) of components of the antivibration system for said detection means.

3rd Embodiment

Figure 3:
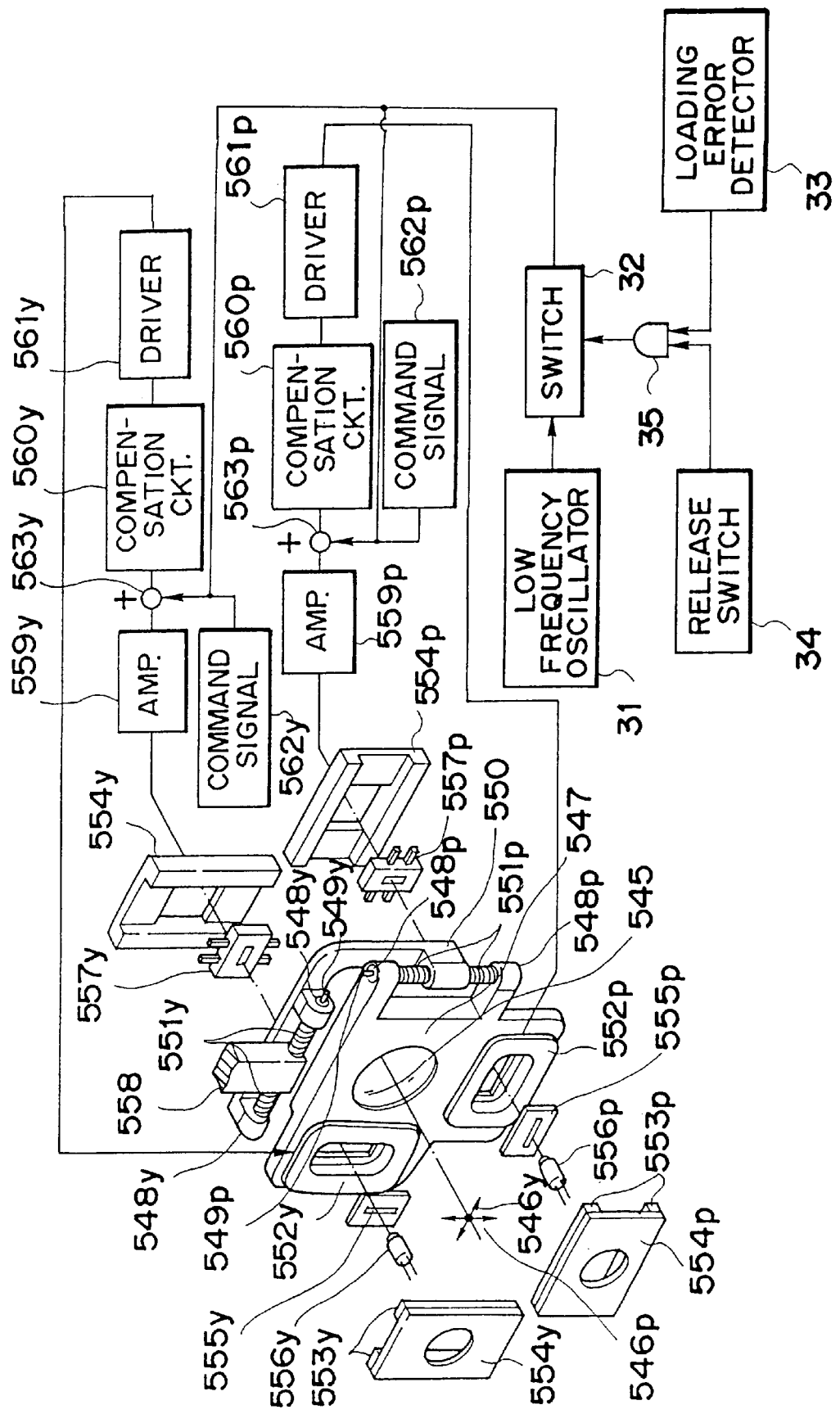
FIG. 3 is a perspective view showing the principal configuration of a camera with antivibration function, constituting a third embodiment of the present invention.

FIG. 3 shows the principal configuration of a camera with antivibration function in a 3rd embodiment of the present invention, wherein same components as those in FIGS. 1 and 2 are represented by same numbers.

In this 3rd embodiment, the compensating optical mechanism is used also as loading error alarm means. In an error occurs at the loading of a film into the camera, loading error detection means 33 generates a signal indicating said error. If the shutter release button is depressed for a phototaking operation in such state and a signal is released from a shutter release switch 34, an AND gate 35 releases a signal whereby a switch 32 transmits the output of a low frequency oscillator 31 to adders $563p$, $563y$.

In response the compensating optical mechanism vibrates with a frequency (4–8 Hz) in two directions (pitch and yaw directions $546p$, $546y$), and this vibration is transmitted to the photographer, informing the loading error thereto. Such configuration enables phototaking operation even in a quiet place, since the alarm is not transmitted by sound or voice.

Naturally a high frequency signal of 1 kHz or higher may be given to the compensating optical mechanism for causing the pitch and yaw coils $552p$, $552y$ to generate an alarm sound.

4th Embodiment

Figure 4:
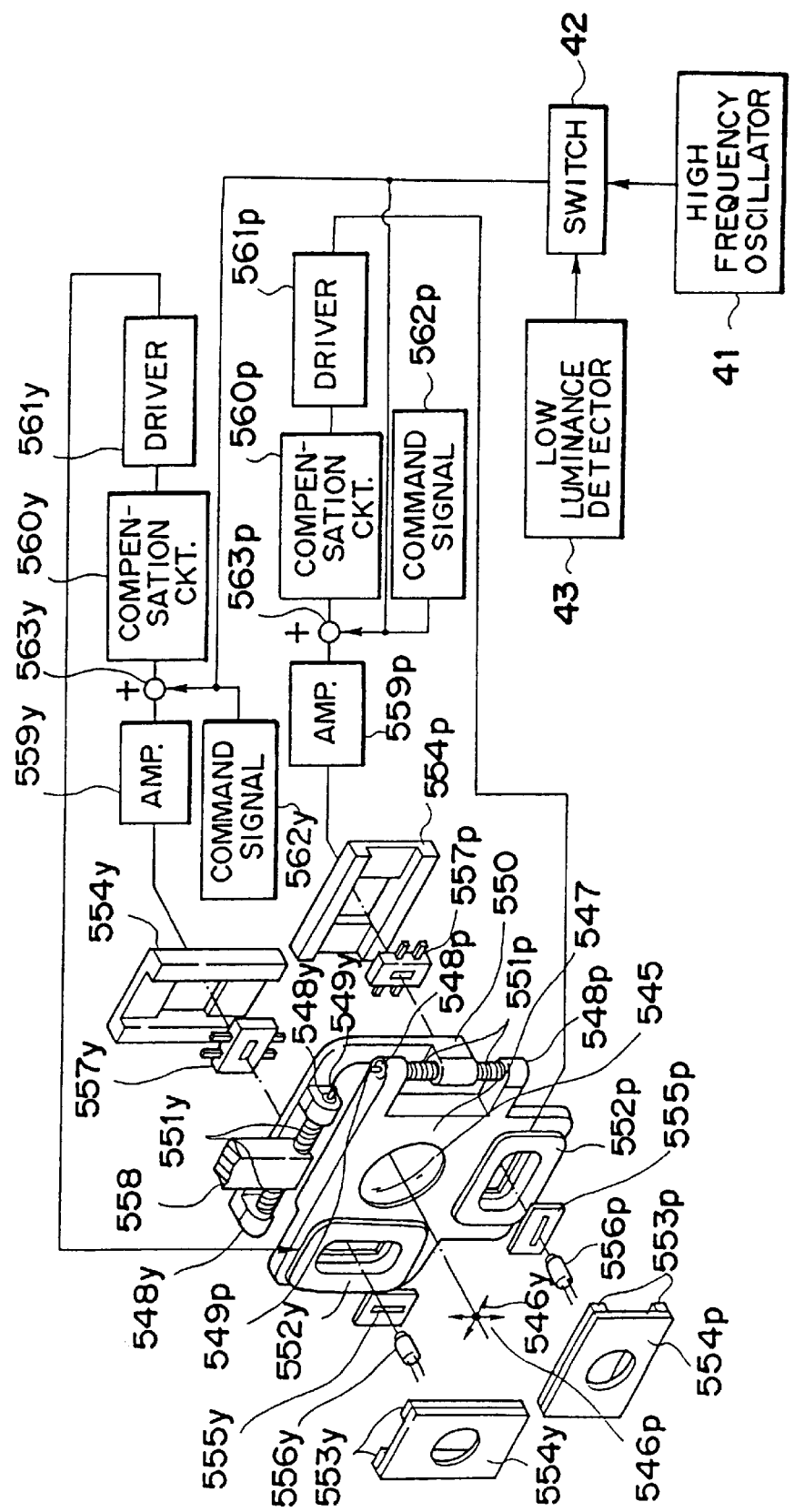
FIG. 4 is a perspective view showing the principal configuration of a camera with antivibration function, constituting a fourth embodiment of the present invention.

FIG. 4 shows the principal configuration of a camera with antivibration function in a 4th embodiment of the present invention, wherein same components as those in FIGS. 1 to 3 are represented by same numbers.

In this 4th embodiment, when low luminance alarm means 43 releases an output signal indicating that the object is dark, the output of a high frequency oscillator 41 is supplied through a switch 42 to the adders $563p$, $563y$, whereby the pitch and yaw coils $552p$, $552y$ receive high frequency signals from the driver circuits $561p$, $561y$ and generate an alarm sound for low luminance.

As explained in the foregoing, in the 3rd and 4th embodiments of the present invention, there is provided abnormality detection means for detecting an abnormality in the function of the camera and alarm means for driving, in response to the detection of abnormality by said detection means, the compensating optical mechanism through the driving means, thereby giving an alarm for the abnormality in the function of the camera, whereby said compensating optical means and the driving means thereof are used also as a part of the alarm means.

5th Embodiment

Figure 5:
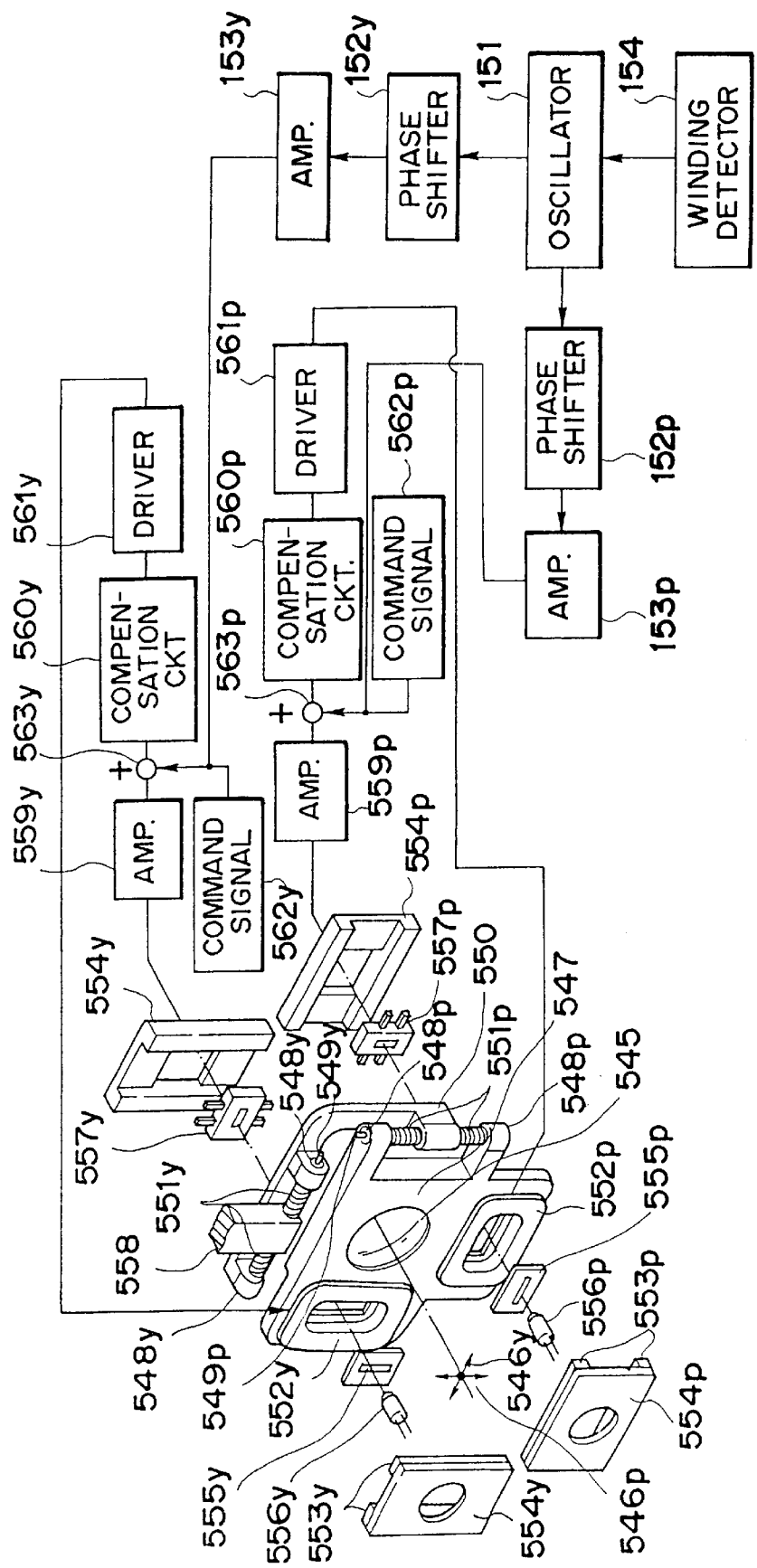
FIG. 5 is a perspective view showing the principal configuration of a camera with antivibration function, constituting a fifth embodiment of the present invention.

FIG. 5 shows the principal configuration of a camera with antivibration function in a 5th embodiment of the present invention, wherein same components as those in FIGS. 1 to 4 are represented by same numbers.

In this 5th embodiment, the compensating optical mechanism is used also as vibration suppressing means.

When the film is advanced by a motor, winding detection means 154 generates an output signal whereby an oscillator 151 starts oscillation. The oscillation frequency of said oscillator 151 is selected at the frequency of the vibration transmitted to the hands, namely the specific frequency including the film driving system and the camera body, and said oscillation signal is subjected to suitable phase shifting and amplification in phase shifters $152y$, $152p$ and amplifiers $153p$, $153y$ and drives the compensating optical mechanism in the pitch and yaw directions $546p$, $546y$.

A vibration suppressing effect can be attained by cancelling the vibration transmitted to the hands at the film advancement, through suitable adjustment of the driving of the compensating optical mechanism in the pitch and yaw directions 546p, 546y by means of said phase shifters 152p, 152y and the amplifiers 153p, 153y.

Figure 11:
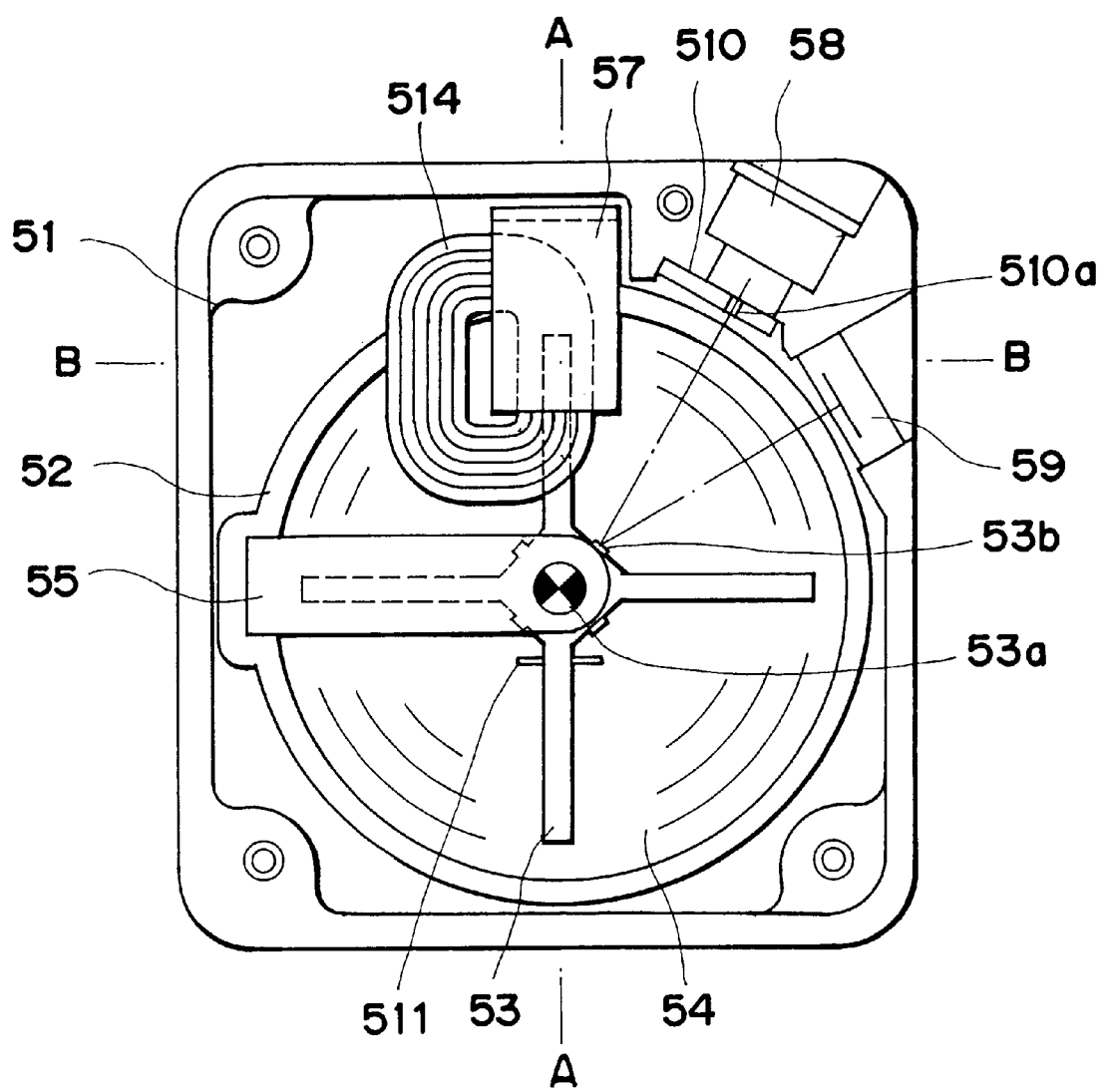
FIG. 11 is a plan view of an angular displacement detecting device, representing an example of the conventional vibration detecting means.
Figure 12:
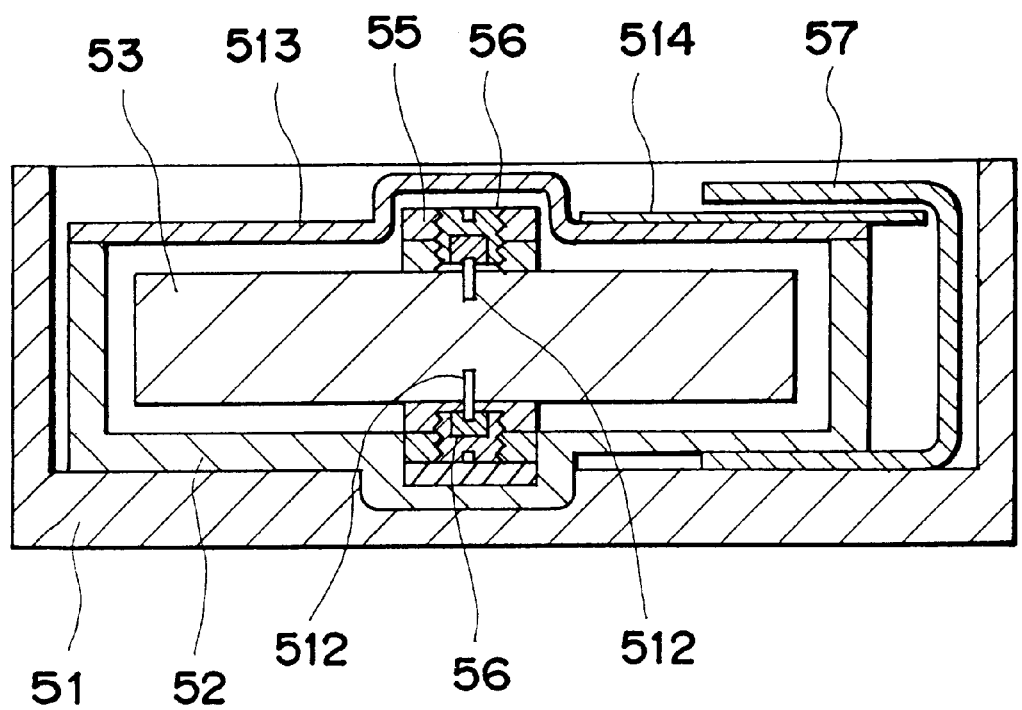
FIG. 12 is a cross-sectional view along a line A—A in FIG. 11.
Figure 13:
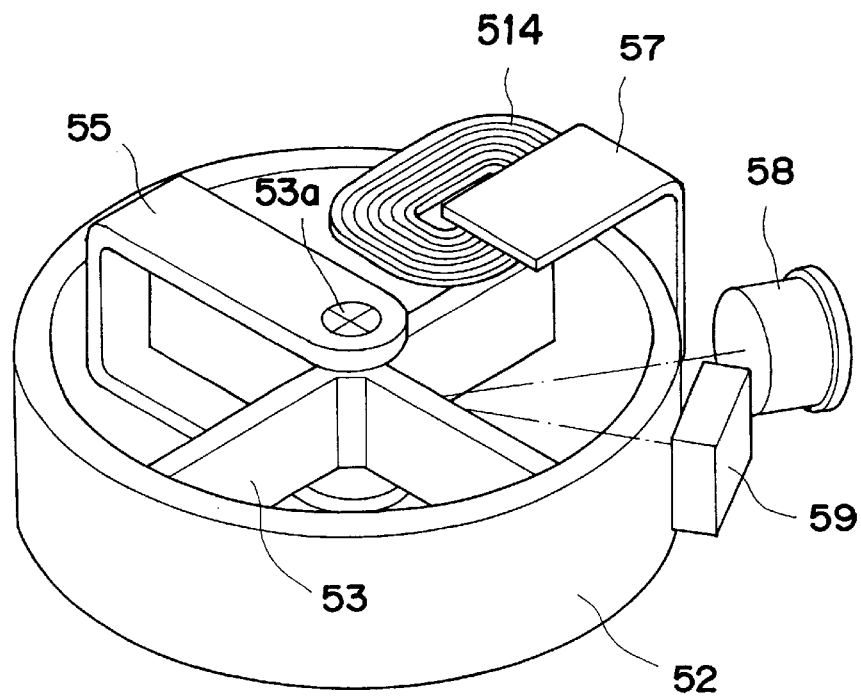
FIG. 13 is a perspective view of the angular displacement detecting device shown in FIG. 11.
Figure 14:
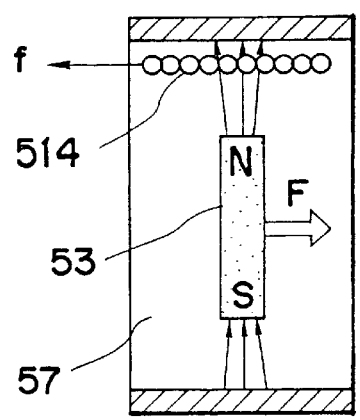
FIG. 14 is a cross-sectional view along a line B—B in FIG. 11.
Figure 15:
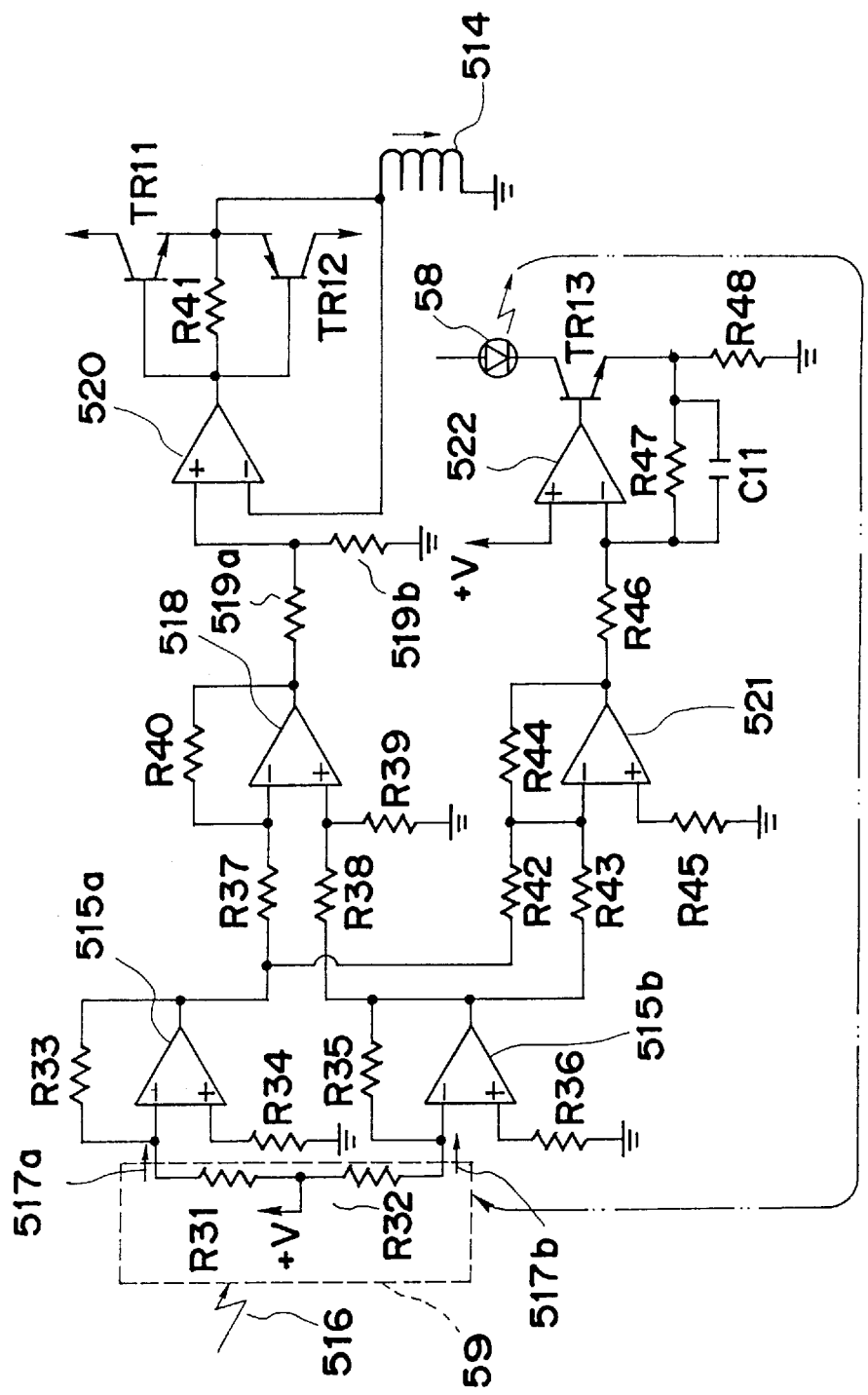
FIG. 15 is a circuit diagram of the angular displacement detecting device shown in FIG. 11.
Figure 16:
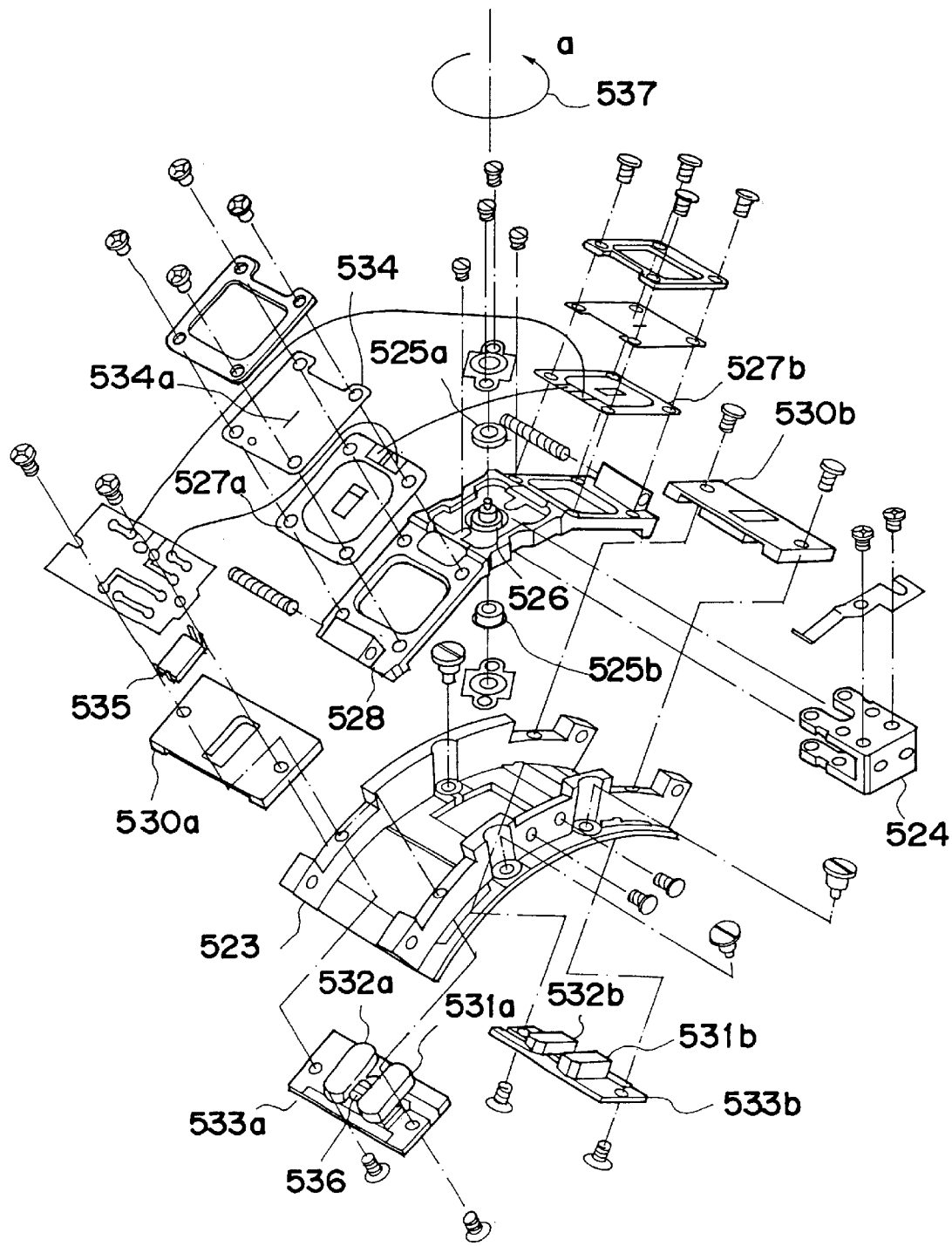
FIG. 16 is an exploded perspective view of a servo angular acceleration detector, representing an example of the conventional vibration detecting means.
Figure 17:
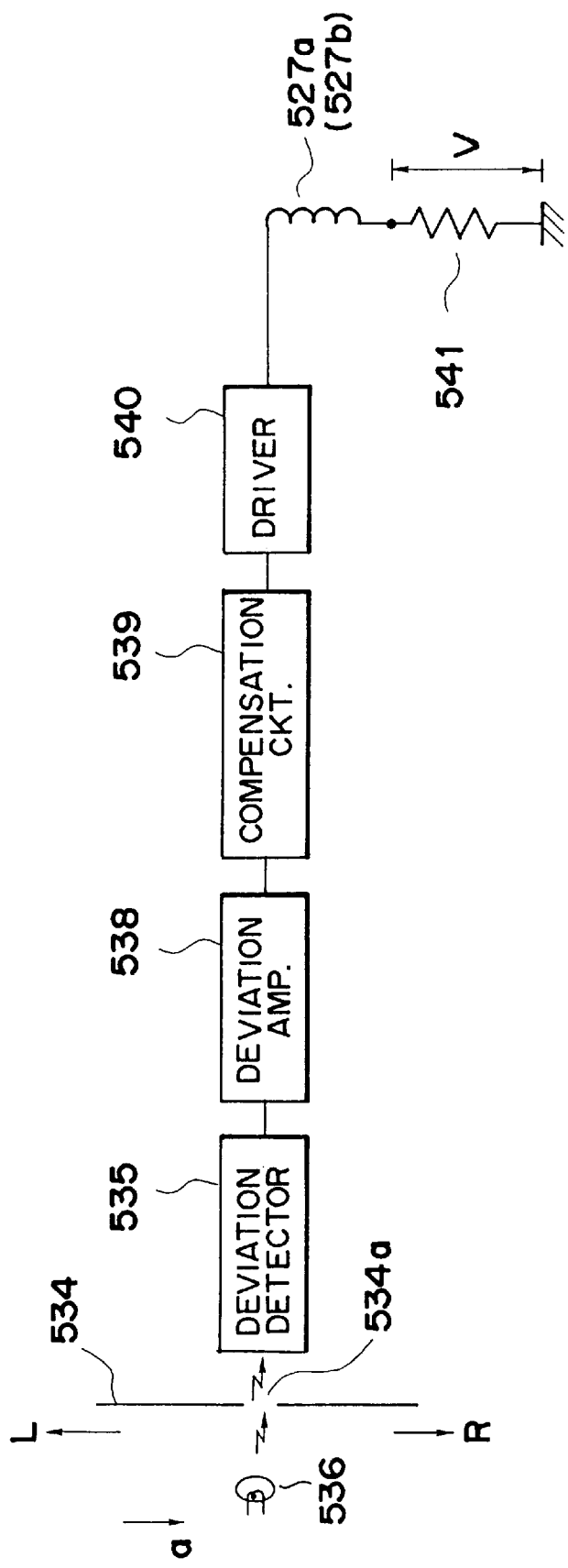
FIG. 17 is a block diagram of the electrical configuration of the servo angular acceleration detector shown in FIG. 16.
Figure 18:
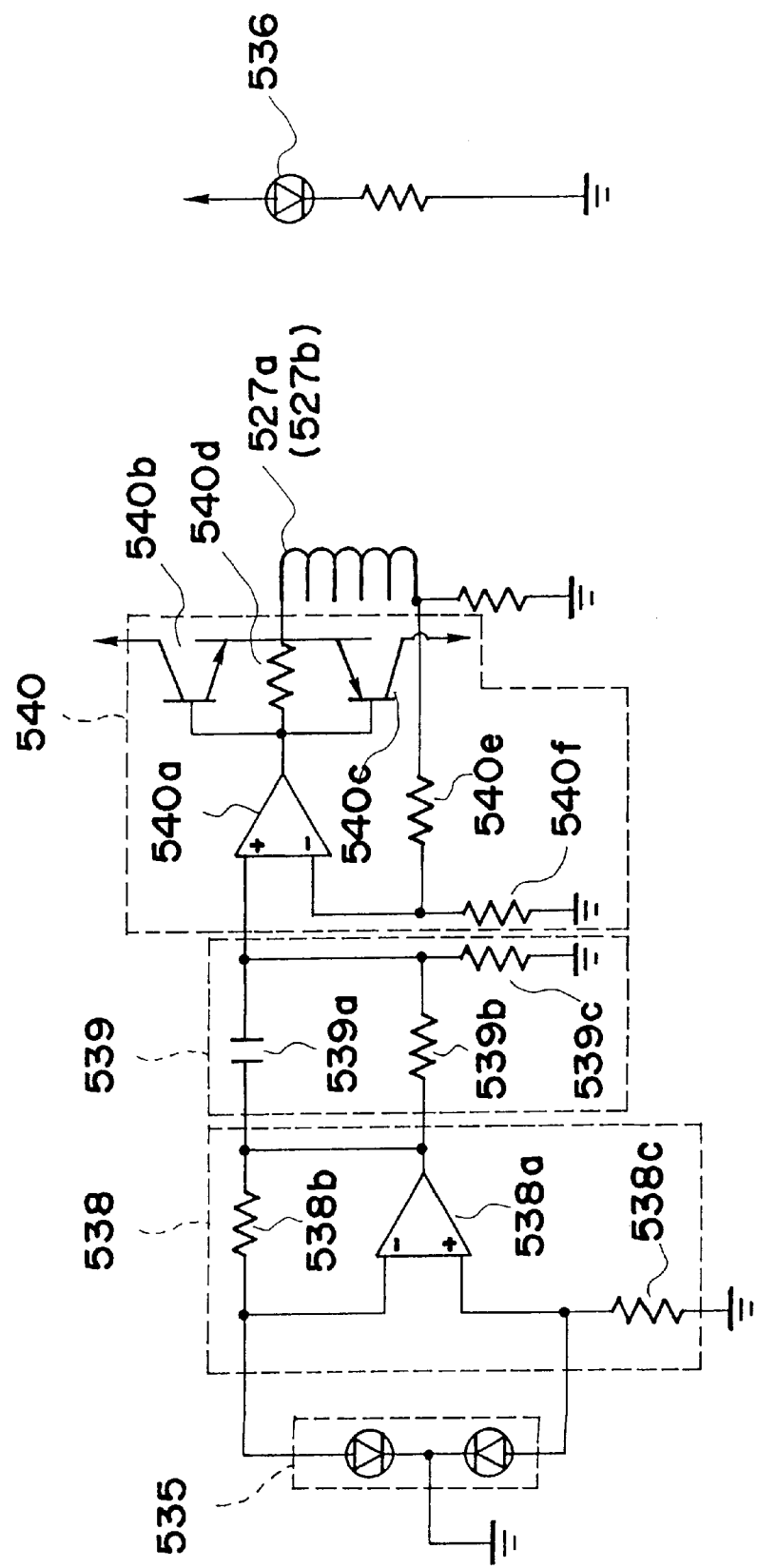
FIG. 18 is a circuit diagram showing the details of the electrical configuration shown in FIG. 17.

In the embodiment shown in FIG. 5 there are in advance provided said phase shifters 152p, 152y and said amplifiers 153p, 153y, but it is also possible to detect the vibration of motor by the angular displacement detecting device shown in FIG. 11 or the angular acceleration detecting device shown in FIG. 16, and to drive the compensation optical mechanism so as to reduce the output of said device.

As explained in the foregoing, in the 5th embodiment of the present invention, there is provided vibration suppressing means for suppressing the vibration, which is generated in the course of a preparatory operation for the phototaking operation of the camera, by driving the compensating optical mechanism through the driving means thereof, and said compensating optical mechanism and driving means are used also as a part of said vibration suppressing means.

6th Embodiment

Figure 6:
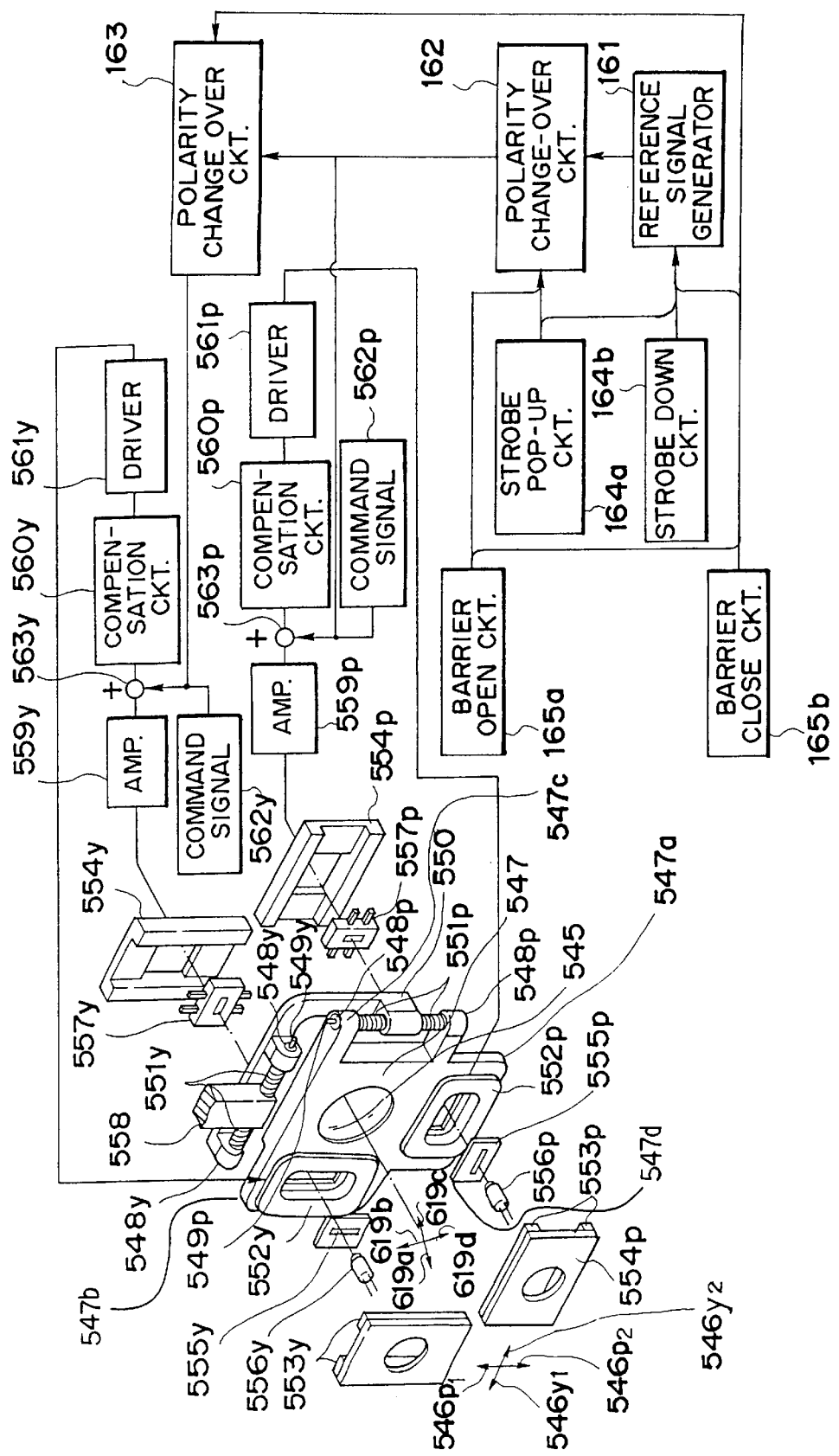
FIG. 6, 7A and 7B are perspective views showing the principal configuration of a camera with antivibration function, constituting a sixth embodiment of the present invention.
Figure 7A:
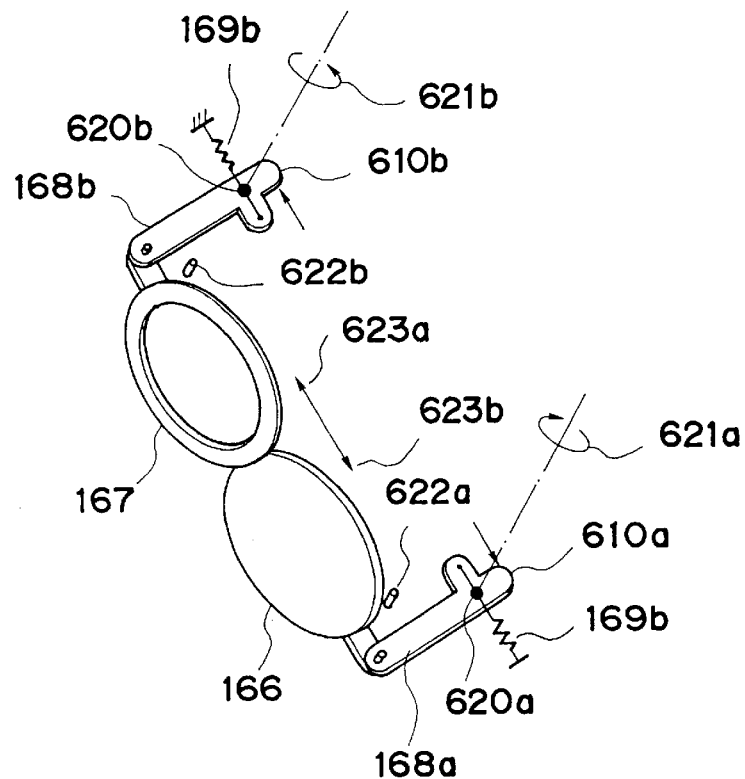
Figure 7B:
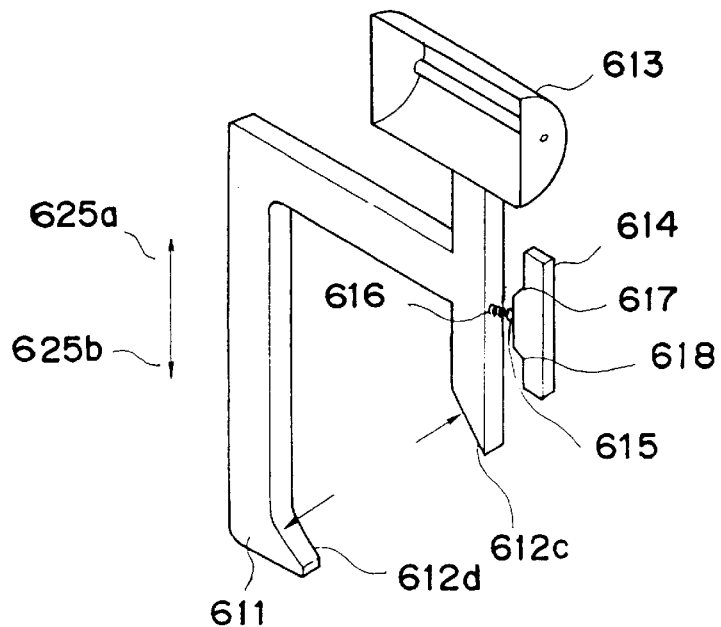
Figure 8:
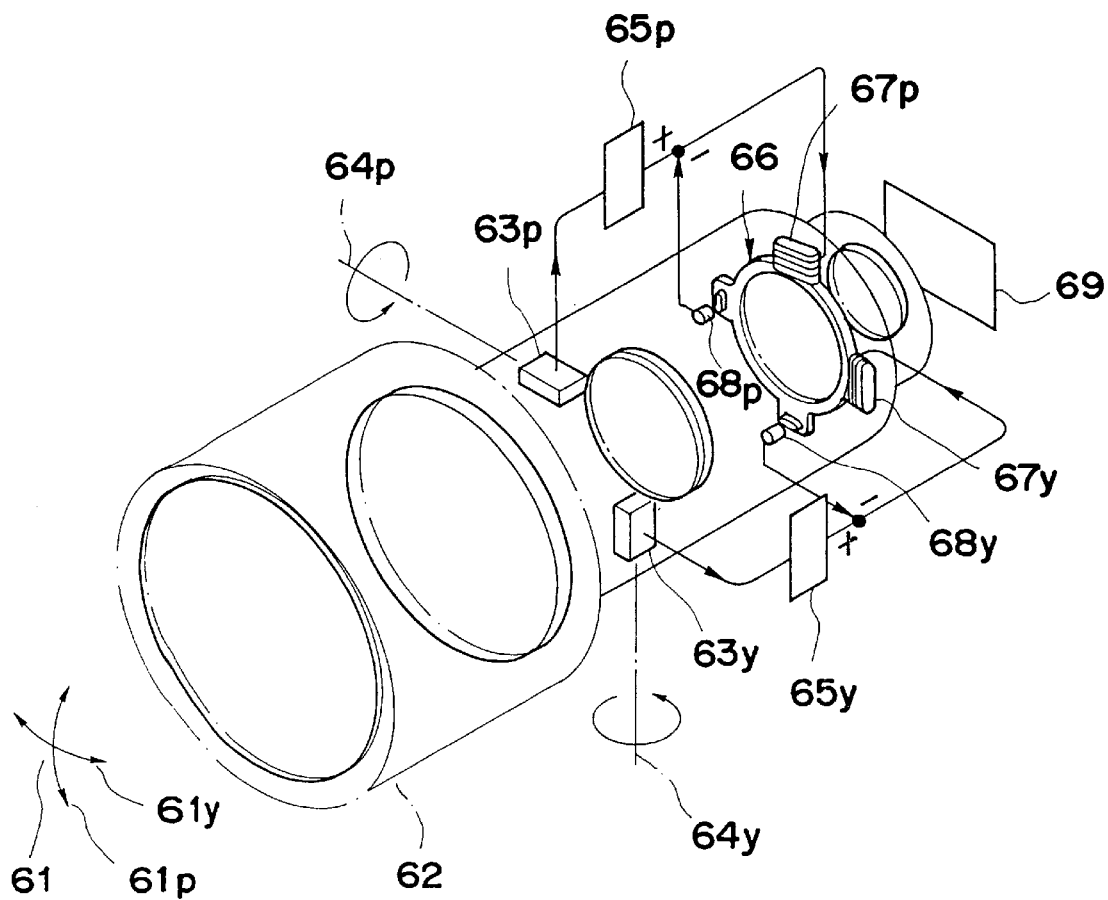
FIG. 8 is a schematic perspective view of a conventional antivibration system.
Figure 9:
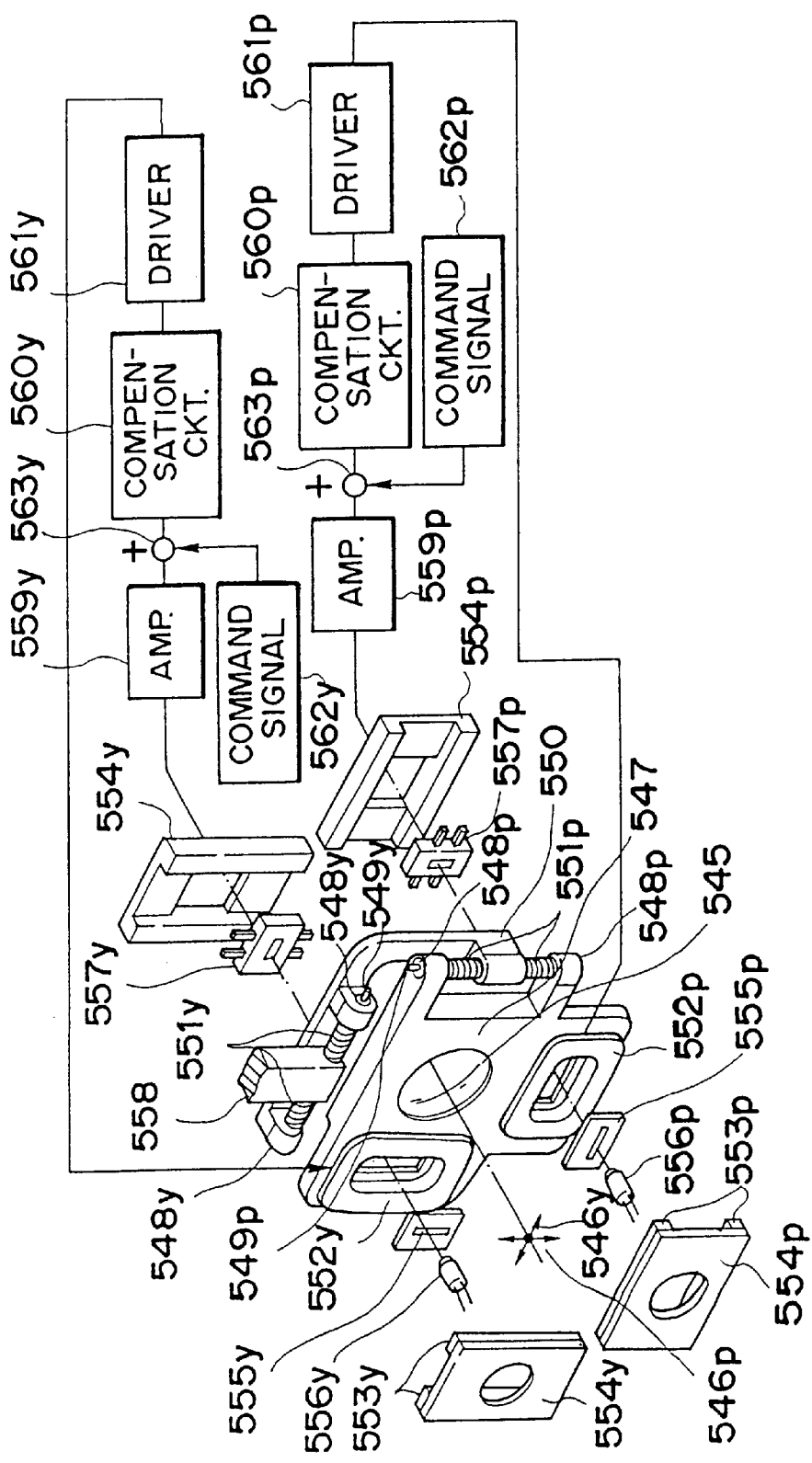
FIG. 9 is a view showing the mechanical and electrical configuration of a compensating optical mechanism in the antivibration system shown in FIG. 8.

FIGS. 6, 7A and 7B are views of a camera with antivibration function in a 6th embodiment of the present invention, wherein same components as those in FIGS. 1 to 5 are represented by same numbers.

In this 6th embodiment, the compensating optical mechanism is used also for opening and closing a lens barrier member and for lifting and lowering an electronic flash unit.

The compensating optical mechanism is so constructed, when it is driven beyond the optical axis deviating stroke, that the four sides 547a, 547b, 547c, 547d of the frame 547 respectively impinge on ends 610a, 610b of a barrier arm 610 and ends 612c, 612d of a flash frame 611.

When an unrepresented main switch of the camera is turned on, a barrier opening circuit 165a releases a barrier opening signal, whereby a reference signal generator 161 generates a reference signal for driving the compensating optical mechanism for a maximum stroke, which exceeds the stroke for the optical axis displacement. Said signal is added to the signal 563p through a polarity change-over circuit 162, which inverts the polarity in response to the output signal of a flash pop-up circuit 164a or a barrier opening circuit 165a, whereby the compensating optical mechanism is driven with the maximum stroke in the pitch direction 546p₁. Said reference signal is also added to the signal 563y through a polarity change-over circuit 163, which inverts the polarity in response to the output signal of the barrier opening circuit 165a or the barrier closing circuit 165b, whereby the compensating optical mechanism is driven with the maximum stroke also in the yaw direction 546y₁.

Consequently the frame 547 is driven with the maximum stroke in a direction 619b, and a frame end 547b presses the barrier arm end 610b. The barrier arm 168b is rotatably supported about an axis 620b, and the rotation in either direction is biased by a spring 169a, functioning as a known toggle spring. Thus, when the frame end 547b presses the barrier arm end 610b, the barrier arm 168b rotates in a direction 621b until it is stopped by a fixed stopper 622b, and is maintained in this position by the function of said spring 169b. In this operation the barrier arm 168b drives an annular barrier frame 167 linked thereto in a direction 623b, and said frame is stabilized in a position where the optical axis is at the center, by means of the stopper 622b (barrier opening operation).

When the main switch of the camera is turned off, the barrier closing circuit 165b releases a barrier closing signal, and the reference signal generator 161 releases the reference signal. As the polarity changeover circuit 162 is not active in this state, the compensating optical mechanism is driven with the maximum stroke in the pitch direction 546p₂ and in the yaw direction 546y₂, whereby the frame 547 is driven in a direction 619d and the frame end 547a impinges on the barrier arm end 610a. In response a barrier arm 168a rotates about the axis 620a in a direction 621a, thus driving a barrier 166 in a direction 623a and stopping said barrier on the optical axis 624 (barrier closing operation).

When the main switch is turned off, the above-explained operations are executed by the electric power accumulated in an unrepresented capacitor, because the power supply is no longer available, but it is also possible to cut off the power supply with a timer when the above-mentioned operations are completed after the main switch is turned off.

Also if the object is dark, an electronic flash unit is to be used. In such situation, the flash pop-up circuit 164a generates a pop-up signal, in response to which the reference signal generator 161 releases the reference signal. After polarity inversion by the changeover circuit 162, said signal is added to the instruction signal 563p, whereby the compensating optical mechanism is driven with the maximum stroke in the pitch direction 546p₁. As the change-over circuit 163 is not active in this state, the compensating optical mechanism is driven with the maximum stroke also in the yaw direction 546y₂. Consequently the frame 547 is driven in a direction 619c whereby the end 547c impinges on the end 612c of the flash frame 611, which in response moves in a direction 625a to lift a flash unit 613. A click mechanism, consisting of a steel ball 615 supported by a spring 616, enters a corner 617 of a cam 614, thereby stabilizing the flash unit (flash pop-up operation).

When the phototaking operation is completed, a flash pop-down circuit 164b generates a pop-down signal, in response to which the reference signal generator 161 releases the reference signal. As the change-over circuits 162, 163 are inactive in this state, the compensating optical mechanism is driven with the maximum stroke in the pitch and yaw directions 546p₂, 546y₁. Thus the frame 547 moves in a direction 619a so that the end 547d presses the end 612d of the flash frame 611. Thus the flash frame 611 moves in a direction 625b against the action of the click mechanism, and is stabilized when the click mechanism engages with the corner 618 of the cam (flash pop-down operation).

In this 6th embodiment, as explained above, the compensating optical mechanism is used also for opening and closing the barrier member and for lifting and lowering the electronic flash unit, thereby dispensing with the actuators for these operations, and enabling reductions in the size, cost and weight of the camera.

As explained in the foregoing, in the 6th embodiment of the present invention, there is provided other functional drive means for causing the compensating optical mechanism, through the drive means therefor, to effect a displacement larger than the displacement required for the optical axis deviation, thereby effecting a function other than the antivibration function, and the compensating optical means and the drive means therefor are used also as the drive means for a function other than the antivibration function.

The foregoing 1st to 6th embodiments have been explained by the applications to a camera utilizing a silver halide film, but they can naturally be applied to a video camera or other optical equipment. Also the 6th embodiment shows the utilization of the compensating optical mechanism for driving the barrier and the flash unit, but the present invention is not limited to such embodiment. For example it is also possible to move the lens for automatic focusing or zooming, by repeating the drive in directions 619a, 619b thereby pushing an actuator member by the ends 547a, 547b and stepwise moving the lens.

What is claimed is:

1. Image blur preventing apparatus comprising:

an operation device operating for an image blur prevention by influencing formation of an image, said operation device performing blur compensation by moving perpendicular to an optical path of said apparatus; and a control device for causing said operation device to perform a further operation which does not influence the formation of the image and is independent of an operation for the image blur prevention.

2. Apparatus according to claim 1, wherein said control device comprises means for using said operation device to detect a direction of gravity.

3. Apparatus according to claim 1, wherein said control device comprises means for providing an alarm signal using said operation device.

4. Apparatus according to claim 1, wherein said control device comprises means for driving said operation device so as to cancel a vibration caused by driving of a motor.

5. Apparatus according to claim 1, wherein said operation device comprises means for deflecting an input light beam.

6. Apparatus according to claim 1, wherein said operation device comprises an image stabilizing means for performing an image stabilizing operation.

7. Apparatus according to claim 1, wherein said control device causes said operation device to perform an image stabilizing operation.

8. Apparatus according to claim 1, wherein said apparatus is disposed in a camera.

9. Apparatus according to claim 1, wherein said apparatus is disposed in an optical equipment.

10. Apparatus according to claim 1, wherein said operation device comprises means for relating the further operation with a state of a function portion for performing a function different from the image blur prevention.

11. Apparatus according to claim 10, wherein said operation device comprises means for controlling the function portion in accordance with information obtained from the further operation.

12. Apparatus according to claim 10, wherein said operation device comprises means for relating the further operation with a photometric operation.

13. Apparatus according to claim 10, wherein said operation device comprises means for relating the further operation with an information recording operation for recording information different from an image to an image recording medium.

14. Apparatus for use with an image blur preventing portion which performs an image blur preventing operation by influencing an image, said apparatus comprising:

an operation device operating for an image blur prevention by influencing formation of an image, said operation device performing blur compensation by moving perpendicular to an optical path of said apparatus; and a control device for causing said operation device to perform a further operation which does not influence the formation of the image and is independent of an operation for the image blur prevention.

15. Apparatus according to claim 14, wherein said operation device comprises means for relating the further operation with a state of a function portion for performing a function different from the image blur prevention.

16. Apparatus according to claim 15, wherein said operation device comprises means for controlling the function portion in accordance with information obtained from the further operation.

17. Apparatus according to claim 15, wherein said operation device comprises means for relating the further operation with a photometric operation.

18. An image blur preventing apparatus comprising:

an operation device operating for an image blur prevention by influencing formation of an image;

a control device for causing said operation device to perform a further operation which does not influence the formation of the image and is independent of an operation for the image blur prevention, said control device comprising means for using said operation device to detect a direction of gravity.

19. An image blur preventing apparatus comprising:

an operation device operating for an image blur prevention by influencing formation of an image;

a control device for causing said operation device to perform a further operation which does not influence the formation of the image and is independent of an operation for the image blur prevention, wherein said operation device comprises means for deflecting an input light beam.

20. An apparatus for use with an image blur preventing portion which performs an image blur preventing operation by influencing an image, said apparatus comprising:

an operation device operating for an image blur prevention by influencing formation of an image; and a control device for causing said operation device to perform a further operation which does not influence the formation of the image and is independent of an operation for the image blur prevention, said control device comprising means for using said operation device to detect a direction of gravity.

21. An apparatus for use with an image blur preventing portion which performs an image blur preventing operation by influencing an image, said apparatus comprising:

an operation device operating for an image blur prevention by influencing formation of an image; and a control device for causing said operation device to perform a further operation which does not influence the formation of the image and is independent of an operation for the image blur prevention, wherein said operation device comprises means for deflecting an input light beam.

* * * * *

UNITED STATES PATENT AND TRADEMARK OFFICE
CERTIFICATE OF CORRECTION

PATENT NO. : 5,946,503
DATED : August 31, 1999
INVENTOR(S) : Koichi Washisu

It is certified that error appears in the above-identified patent and that said Letters Patent is hereby corrected as shown below:

Column 2,
Line 12, "in-the" should read -- in the --.

Column 3,
Line 57, "These" should read -- The --.

Column 6,
Line 18, "SPC" should read -- SPD --.

Column 8,
Line 36, "open/closing" should read -- opening/closing --.

Column 10,
Line 33, "17p," should read -- $17p_1$, --; and
Line 53, "in an absolute value" should be deleted.

Signed and Sealed this

Ninth Day of April, 2002

*Attest:*

*Attesting Officer*

JAMES E. ROGAN
*Director of the United States Patent and Trademark Office*